(12) United States Patent
Manzoor

(10) Patent No.: US 9,599,209 B2
(45) Date of Patent: Mar. 21, 2017

(54) TORSIONAL VIBRATION DAMPERS

(71) Applicant: Suhale Manzoor, Plymouth, MI (US)

(72) Inventor: Suhale Manzoor, Plymouth, MI (US)

(73) Assignee: DAYCO IP HOLDINGS, LLC, Troy, MI (US)

( * ) Notice: Subject to any disclaimer, the term of this patent is extended or adjusted under 35 U.S.C. 154(b) by 42 days.

(21) Appl. No.: 14/639,416

(22) Filed: Mar. 5, 2015

(65) Prior Publication Data

US 2015/0252885 A1    Sep. 10, 2015

Related U.S. Application Data

(60) Provisional application No. 61/948,135, filed on Mar. 5, 2014, provisional application No. 61/987,784, filed on May 2, 2014.

(51) Int. Cl.
| | |
|---|---|
| *F16H 55/36* | (2006.01) |
| *F16F 15/12* | (2006.01) |
| *F16F 15/126* | (2006.01) |
| *F02B 67/06* | (2006.01) |

(52) U.S. Cl.
CPC ........... *F16H 55/36* (2013.01); *F16F 15/126* (2013.01); *F02B 67/06* (2013.01); *F16H 2055/366* (2013.01); *Y10T 29/49817* (2015.01)

(58) Field of Classification Search
CPC . Y10T 74/2131; F16F 15/1442; F16F 15/126; F16H 2055/366; F16H 55/36
USPC ........................................ 474/166; 74/574.4
See application file for complete search history.

(56) References Cited

U.S. PATENT DOCUMENTS

| | | | | |
|---|---|---|---|---|
| 1,815,807 | A * | 7/1931 | Stamm | F16F 15/14 74/574.2 |
| 1,830,600 | A * | 11/1931 | Fifield | F16F 15/1492 192/30 R |
| 1,852,789 | A * | 4/1932 | Peterson | F16H 55/14 74/443 |
| 1,928,119 | A * | 9/1933 | Vargha | F16F 15/1442 74/574.2 |
| 1,949,520 | A * | 3/1934 | Whisler | F16F 15/136 464/96 |

(Continued)

OTHER PUBLICATIONS

PCT, International Search Report and Written Opinion; International Application No. PCT/US15/18890 (Jun. 12, 2015).

*Primary Examiner* — Henry Liu
(74) *Attorney, Agent, or Firm* — Thompson Hine LLP

(57) ABSTRACT

Torsional vibration dampers having a hub integral with a pulley body for rotation therewith and at least an annular first elastomeric member seated on the pulley body between the outer belt engaging surface and the hub and held thereagainst for rotation therewith by a first inertia ring connected to the pulley body are disclosed. The torsional vibration dampers may also include an annular second elastomeric member seated on the pulley body, on a side opposite the annular first elastomeric member, between the outer belt engaging surface and the hub and held thereagainst for rotation therewith by a second inertia ring connected to the pulley body or seated on the first inertia member, on a side opposite the first elastomeric member, between the first inertia member and a front end cap, where the front end cap compresses the second elastomeric member against the first inertia member.

15 Claims, 7 Drawing Sheets

(56) References Cited

U.S. PATENT DOCUMENTS

| | | | | |
|---|---|---|---|---|
| 2,450,701 A * | 10/1948 | Wahlberg | F16D 3/70 | 29/450 |
| 2,514,139 A * | 7/1950 | O'Connor | F16F 15/173 | 74/573.1 |
| 2,557,511 A * | 6/1951 | Oles | F16F 15/129 | 74/574.2 |
| 2,594,555 A * | 4/1952 | Hardy | F16F 15/1442 | 165/47 |
| 2,636,399 A * | 4/1953 | O'Connor | F16F 15/1442 | 188/322.5 |
| 2,716,904 A * | 9/1955 | Schuldt | F02B 75/06 | 74/574.2 |
| 2,723,573 A * | 11/1955 | Dillman | F16F 15/1442 | 74/574.4 |
| 2,764,038 A * | 9/1956 | Peirce | F16F 15/1442 | 74/574.4 |
| 2,795,037 A * | 6/1957 | Haushalter | F16F 15/126 | 29/235 |
| 2,861,472 A * | 11/1958 | Hansz | F16F 15/126 | 74/574.4 |
| 3,066,399 A * | 12/1962 | Saunders | F16F 15/12 | 29/235 |
| 3,077,123 A * | 2/1963 | Katzenberger | F16F 15/1442 | 464/68.41 |
| 3,078,737 A * | 2/1963 | McGavern | F16F 15/1442 | 188/268 |
| 3,196,710 A * | 7/1965 | Peirce | F16F 15/1442 | 188/268 |
| 3,257,860 A * | 6/1966 | Runde | B62D 55/0963 | 464/75 |
| 3,716,901 A | 2/1973 | Bragg et al. | | |
| 3,734,484 A * | 5/1973 | Hall | F16F 15/167 | 267/129 |
| 3,788,195 A | 1/1974 | Lange | | |
| 4,023,438 A * | 5/1977 | Birkle | F02B 77/00 | 188/268 |
| 4,041,803 A * | 8/1977 | Goloff | 416/134 R | |
| 4,150,587 A * | 4/1979 | Bremer, Jr. | F16F 15/1442 | 464/89 |
| 4,317,388 A * | 3/1982 | Wojcikowski | F16F 15/1414 | 74/443 |
| 4,355,990 A | 10/1982 | Duncan, Jr. | | |
| 4,794,816 A * | 1/1989 | Serizawa | F16F 15/126 | 474/166 |
| 4,848,183 A * | 7/1989 | Ferguson | F01L 1/02 | 184/15.1 |
| 4,850,243 A * | 7/1989 | George | F16F 15/1442 | 74/574.4 |
| 4,881,426 A * | 11/1989 | Serizawa | F16F 15/126 | 474/166 |
| 5,405,296 A * | 4/1995 | Cerny | F16F 15/126 | 464/89 |
| 5,425,287 A * | 6/1995 | Beattie | F16F 15/1442 | 464/180 |
| 5,516,331 A * | 5/1996 | Morr | F16D 3/76 | 464/7 |
| 5,562,544 A * | 10/1996 | Ochs | F16F 15/1442 | 464/89 |
| 5,611,416 A * | 3/1997 | Berger | F16D 35/005 | 192/104 F |
| 5,823,904 A | 10/1998 | Hodjat et al. | | |
| 5,957,740 A * | 9/1999 | Matsuda | B63H 21/305 | 114/55.51 |
| 5,966,996 A * | 10/1999 | Hamaekers | F16F 15/1442 | 464/180 |
| 5,988,015 A * | 11/1999 | Riu | F16F 15/124 | 464/90 |
| 6,106,421 A * | 8/2000 | Graber | F16F 15/126 | 474/94 |
| 6,161,450 A * | 12/2000 | Sandig | B29C 70/742 | 264/328.1 |
| 6,171,194 B1 * | 1/2001 | Haga | F16D 3/52 | D3/52 |
| 6,675,759 B2 * | 1/2004 | Johnson | F16F 15/1201 | 123/192.1 |
| 6,875,113 B2 * | 4/2005 | Nichols | F16F 15/1442 | 464/90 |
| 6,955,252 B2 | 10/2005 | Allport | | |
| 7,166,678 B2 * | 1/2007 | Dunlap | B32B 1/08 | 428/344 |
| 7,197,959 B2 * | 4/2007 | Crissy | F16F 15/126 | 464/90 |
| 7,291,241 B2 * | 11/2007 | Dunlap | C08J 3/244 | 156/245 |
| 7,437,808 B2 * | 10/2008 | Hodjat | B22F 8/00 | 100/34 |
| 7,658,127 B2 * | 2/2010 | Crist | F16F 15/126 | 74/572.2 |
| 7,905,159 B2 * | 3/2011 | Manzoor | F16F 15/124 | 74/574.4 |
| 8,015,897 B2 | 9/2011 | Fisher | | |
| 8,146,457 B2 * | 4/2012 | Wright | F16F 15/145 | 74/572.2 |
| 8,397,602 B2 * | 3/2013 | Christenson | F16F 15/126 | 74/574.4 |
| 2004/0159507 A1 * | 8/2004 | Allport | F16D 3/12 | 188/130 |
| 2005/0050985 A1 * | 3/2005 | Crissy | F16F 15/126 | 74/574.4 |
| 2007/0295569 A1 * | 12/2007 | Manzoor | F16F 15/124 | 188/379 |
| 2008/0047392 A1 * | 2/2008 | Ciaccio | F16F 15/1442 | 74/574.4 |
| 2008/0153638 A1 * | 6/2008 | Serkh | F02B 67/06 | 474/74 |
| 2009/0000421 A1 * | 1/2009 | Christenson | F16F 15/126 | 74/574.4 |
| 2009/0000422 A1 * | 1/2009 | Christenson | F16F 7/108 | 74/574.4 |
| 2009/0107739 A1 * | 4/2009 | Major | B60K 6/485 | 180/53.8 |
| 2011/0265755 A1 | 11/2011 | Hayes et al. | | |
| 2013/0079162 A1 * | 3/2013 | Rodenbach | F16D 1/101 | 464/92 |
| 2014/0329629 A1 * | 11/2014 | Vukojicic | F16H 55/36 | 474/94 |

* cited by examiner

TORSIONAL VIBRATION DAMPERS

RELATED APPLICATIONS

This application claims the benefit of U.S. Provisional Application No. 61/948,135, filed Mar. 5, 2014 and the benefit of U.S. Provisional Application No. 61/987,784, filed May 2, 2014, both of which are incorporated herein by reference.

FIELD OF THE DISCLOSURE

The present invention relates to torsional vibration dampers for vehicle engines and, more particularly, to a front end accessory drive system having one of the torsional vibration dampers mounted on a crankshaft.

BACKGROUND

Originally a crankshaft drove the front end assembly drive (FEAD) system of an engine. The crankshaft was turned by the firing of pistons, which exerted a rhythmic torque on the crankshaft, rather than being continuous. This constant application and release of torque caused vacillations, which would stress the crankshaft to the point of failure. Stated another way, the crankshaft is like a plain torsion-bar, which has a mass and a torsional spring rate, that causes the crankshaft to have its own torsional resonant frequency. The torque peaks and valleys, plus the inertia load from the acceleration of the reciprocating components, cause the crankshaft itself to deflect (rotationally) forward and backward while it is operating. When those pulses are near the crankshaft resonant frequency, they would cause the crank to vibrate uncontrollably and eventually break. Accordingly, a torsional vibration damper (sometimes referred to as a crankshaft damper) is mounted on the crankshaft to solve this problem by counteracting torque to the crank negating the torque twisting amplitude placed upon the crankshaft by periodic firing impulses and to transfer rotational motion into the FEAD system, typically by driving an endless power transmission belt.

While existing torsional vibration dampers have been effective to extend the life of the crankshaft and to drive the FEAD system, changes in vehicle engine operation such as the introduction of start-stop systems to conserve fuel consumption add complexities to the system that the existing torsional vibration dampers are not designed to address. For instance, the start-stop system introduces impact forces due to belt starts that introduce the potential slip in the elastomer-metal interface in traditional torsion vibration dampers. Another concern is maintaining good axial and radial run-outs between the metallic components.

The new torsional vibration dampers disclosed herein eliminate or reduce the potential slip in the elastomer-metal interface within the damper during belt start-stop scenarios and improve the axial and radial run-outs and locations between the seal nose and the belt-engaging surface.

SUMMARY

In one aspect, torsional vibration dampers having a hub integral with a pulley body for rotation therewith are disclosed and at least an annular first elastomeric member seated on the pulley body between the outer belt engaging surface and the hub and held thereagainst for rotation therewith by a first inertia ring connected to the pulley body. The pulley body has an outer belt-engaging surface. In one embodiment, the torsional vibration dampers also include an annular second elastomeric member seated on the pulley body, on a side opposite the annular first elastomeric member, between the outer belt engaging surface and the hub and held thereagainst for rotation therewith by a second inertia ring connected to the pulley body. One or more fasteners connect the first inertia member to the second inertia member.

In one embodiment, the torsional vibration damper has a pulley body-hub monolithic member having a hub portion and a pulley body portion, and a first inertia member and a second inertia member fixedly or removably attached to generally parallel congruent faces of the pulley body portion for rotation therewith with an elastomeric member between each inertia member and the pulley body to dampen vibrational frequencies.

In another embodiment, the annular first elastomeric member, in an assembled cross-section taken along the axis of rotation, has a trapezoidal cross-sectional and so may the annular second elastomeric member. To accommodate the trapezoidal cross-sectional shape of the elastomeric members, one or more of the portions of the first inertia ring and portions of the pulley body in contact with the annular first elastomeric member may be beveled radially outward thereby defining a smaller gap for the annular first elastomeric member more proximate the axis of rotation than most distal the axis of rotation, and similarly one or more of the portions of the second inertia ring and portions of the pulley body in contact with the annular second elastomeric member may be beveled radially outward thereby defining a smaller gap for the annular second elastomeric member more proximate the axis of rotation than most distal the axis of rotation.

In another embodiment, the annular first elastomeric member comprises a first O-ring and a second O-ring, wherein the first O-ring has a larger inner diameter than the outer diameter of the second O-ring, and the first O-ring is disposed concentric with and radially outward of the second O-ring. The first O-ring may be seated against the second O-ring.

In another aspect, torsional vibration dampers having a hub integral with a pulley body for rotation therewith are disclosed and at least an annular first elastomeric member seated on the pulley body between the outer belt engaging surface and the hub and held thereagainst for rotation therewith by a first inertia ring connected to the pulley body. Additionally, the torsional vibration damper includes an annular second elastomeric member seated on the first inertia member, on a side opposite the first elastomeric member, between the first inertia member and a front end cap, wherein the front end cap places the annular second elastomeric member in compression against the first elastomeric member. In one embodiment, this torsional vibration damper may also include a tone wheel connected to the pulley body.

In another aspect, a front end accessory drive (FEAD) system having one of the torsional vibration dampers disclosed herein is disclosed. The FEAD system also includes an endless drive belt operably associated with the outer belt-engaging surface of the pulley body, and one or more accessories for a vehicle engine, each of the one or more accessories having a shaft and a corresponding pulley operably associated with the endless drive belt.

In another aspect, methods for replacing the elastomeric members in any one of the torsional vibration dampers are disclosed. The method may include providing one of the torsional vibration dampers disclosed herein attached to a shaft for rotation therewith, and, while the torsional vibration damper is attached to the shaft, (a) disconnecting the first inertia member from the pulley body-hub monolithic member thereby providing access to at least a first elastomeric member, (b) removing the first elastomeric member, (c) replacing the first elastomeric member with a new elastomeric member, and (d) reconnecting the first inertia member to the pulley body-hub monolithic member.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
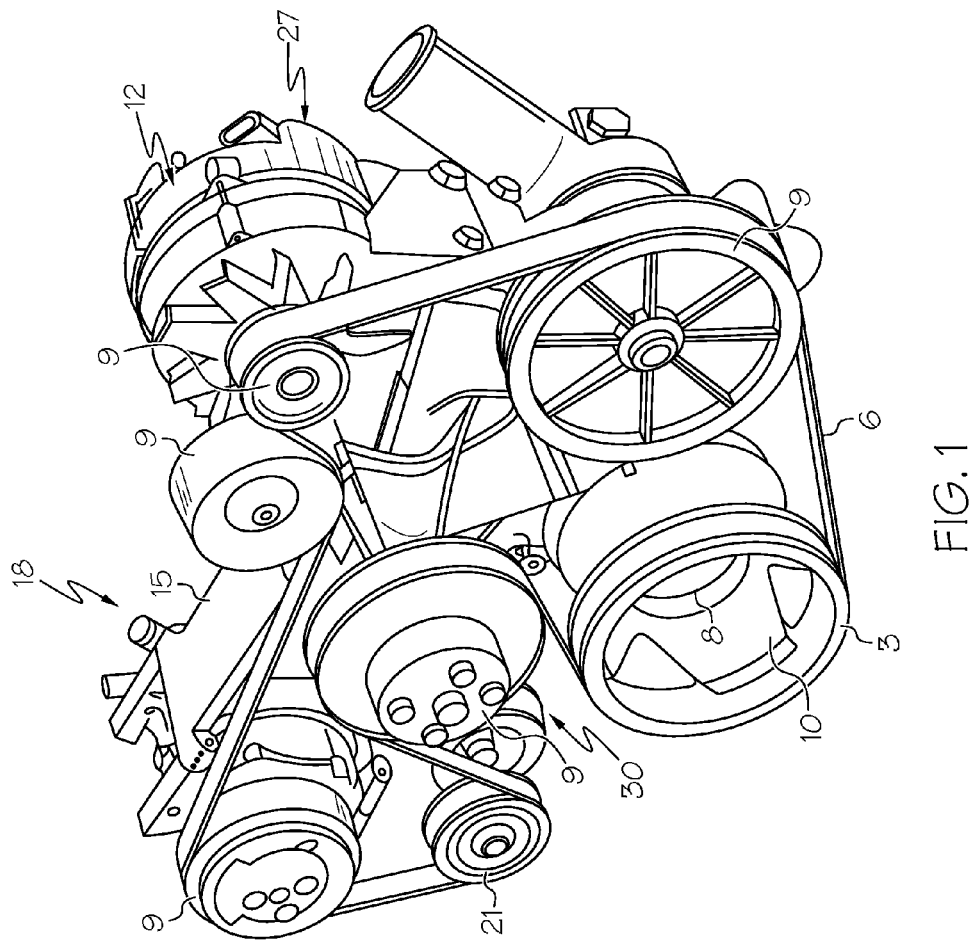
FIG. 1 is a perspective view of components in a front end accessory drive.

Reference is now made in detail to the description of the embodiments as illustrated in the drawings. While several embodiments are described in connection with these drawings, there is no intent to limit the disclosure to the embodiment or embodiments disclosed herein. On the contrary, the intent is to front end cap all alternatives, modifications, and equivalents.

Referring now to FIG. 1, an example of one embodiment of an FEAD system 18 is shown, merely for illustration purposes, that includes an integrated housing 15, having a front surface 30 and a rear surface 27. The rear surface 27 of the integrated housing 15 is preferably mounted to an engine. The FEAD system 18 may be utilized with any engine, including vehicle, marine and stationary engines. The shape and configuration of the integrated housing 15 depends upon the vehicle engine to which it is to be mounted. Accordingly, the integrated housing 15 and more specifically the FEAD system 18 may vary along with the location of engine drive accessories 9 and still achieve the objects of the present invention. It should be understood that the location and number of engine drive accessories 9 may be varied. For example, a vacuum pump, a fuel injection pump, an oil pump, a water pump, a power steering pump, an air conditioning pump, and a cam drive are examples of other engine drive accessories 9 that may be mounted on the integrated housing 15, for incorporation into the FEAD system 18. The engine drive accessories 9 are preferably mounted to the integrated housing 15 by bolts or the like at locations along the surface that are tool accessible for easy mounting and also service accessible. In FIG. 1, the integrated housing 15 has a plurality of engine drive accessories 9, including an alternator 12 and a belt tensioner 21.

The engine drive accessories 9 are driven by at least one endless drive belt 6, which may be a flat belt, a rounded belt, a V-belt, a multi-groove belt, a ribbed belt, etc., or a combination of the aforementioned belts, being single- or double-sided. The endless drive belt 6 may be a serpentine belt, and is wound around the engine drive accessories 9, the alternator 12 and the torsional vibration damper 3, which is connected to the nose 10 of the crankshaft 8. The crankshaft drives the torsional vibration damper 3 and thereby drives the endless drive belt 6, which in turn drives the remaining engine drive accessories 9 and the alternator 12.

Figure 2:
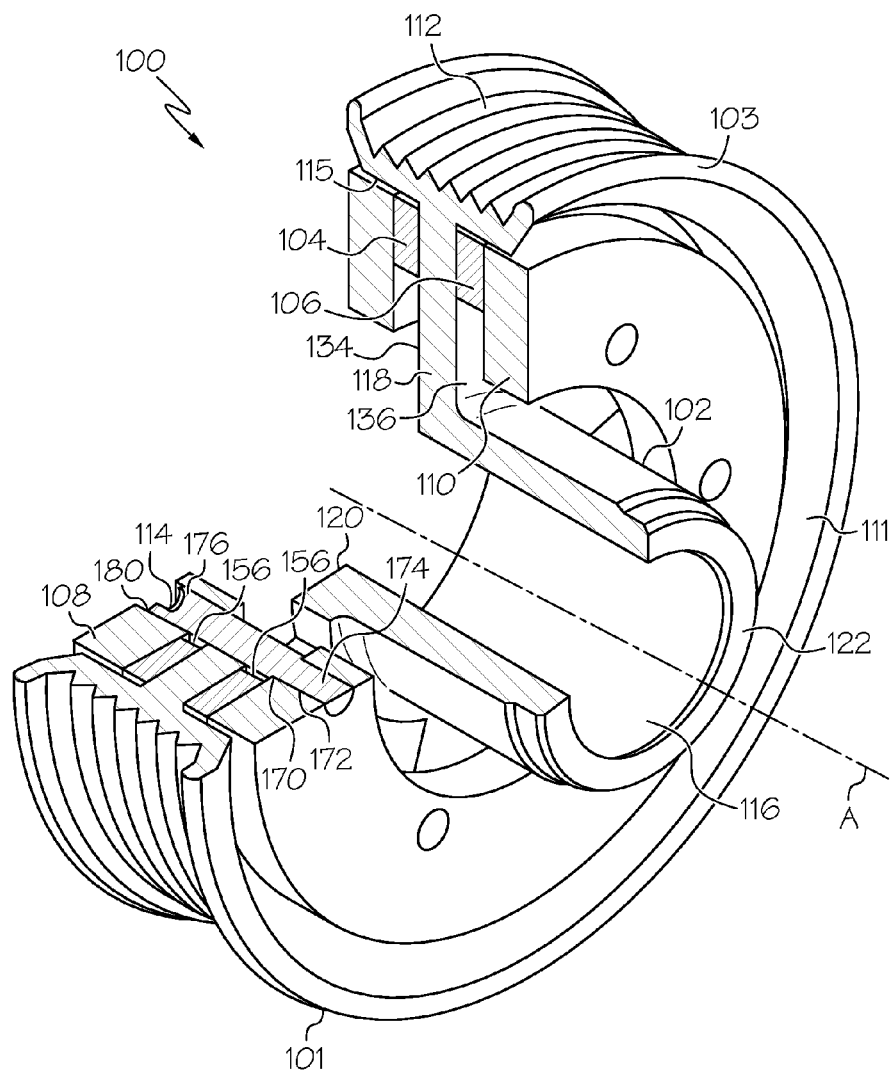
FIG. 2 is a partial cut-away, perspective view of a torsional vibration damper mountable on a crankshaft in an engine.
Figure 3:
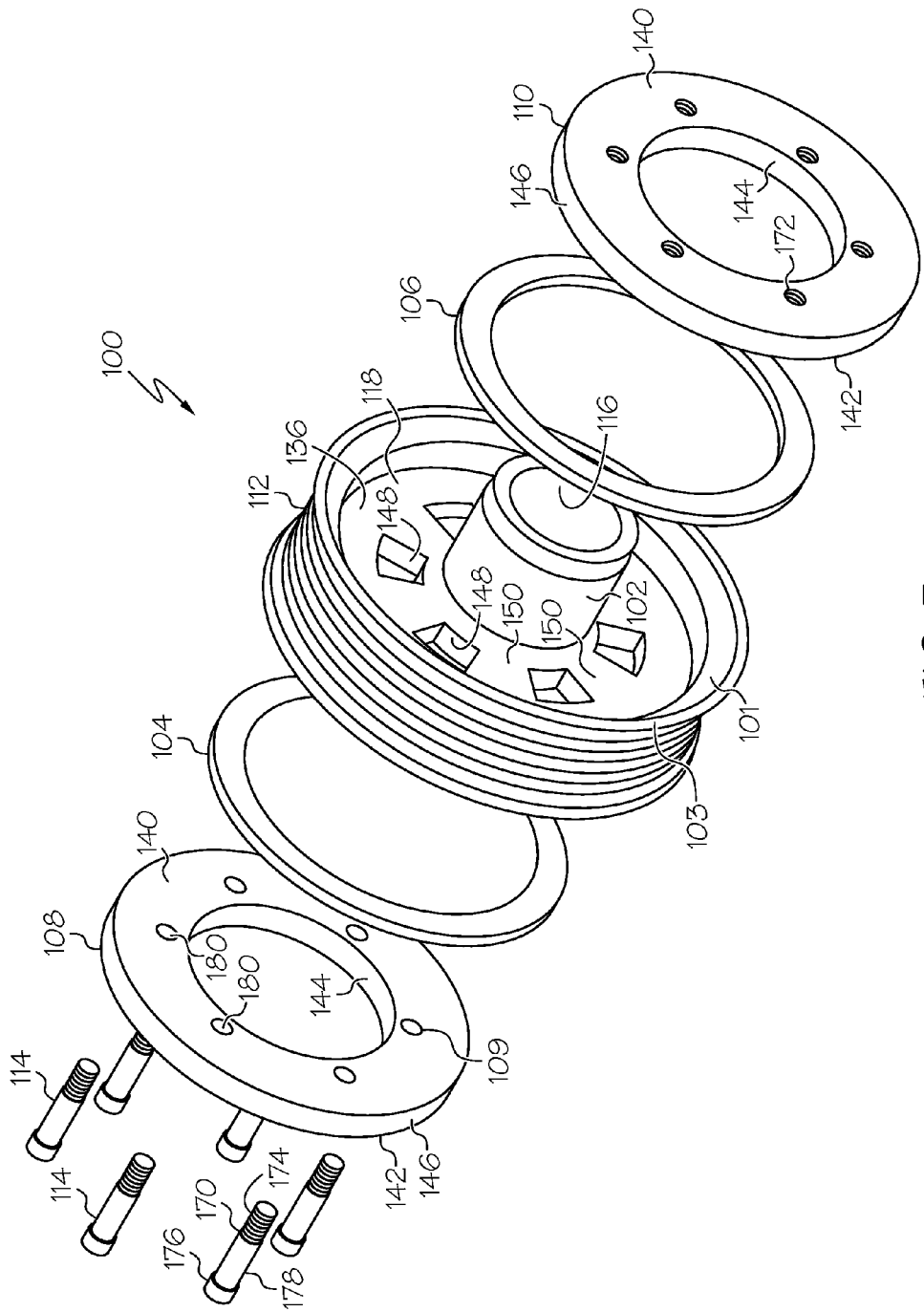
FIG. 3 is an exploded, perspective view of the torsional vibration damper of FIG. 1.

The improvement to the FEAD system 18 herein is a new torsional vibration damper, generally designated by reference 100, exemplified in FIGS. 2 and 3. The torsional vibration damper 100 has a pulley body-hub monolithic member 101 having a hub portion 102, a pulley body portion 103, and one or more inertia members 108, 110 fixedly or removably attached to one or more generally parallel congruent faces 134, 136 of the pulley body portion 103 each with an elastomeric member 104, 106 therebetween to dampen and/or absorb the vibrational frequencies of a rotating member, such as a crankshaft. The elastomeric members 104, 106 (if both are present) and the one or more inertia members 108, 110 are disposed adjacent to the back side 115 of the outer belt-engaging surface 112 of the pulley body portion 103 and the inertia members 108, 110 hold the elastomeric members 104, 106, respectively in compression against the pulley body portion 103. The pulley body-hub monolithic member 101 provides for a "direct" drive system, i.e., one where the endless belt rides on the belt engaging surface 112 of the hub. A benefit to this construction is that the belt-engaging surface 112 will oscillate with reduced amplitude compared to an "indirect" drive system, i.e., one where the endless belt rides the inertia member which is indirectly coupled to the hub and is tuned to oscillate with an enhanced magnitude that is out of phase relative to the angular amplitude of vibration of the hub/crankshaft. The constructions disclosed herein are advantageous in that they eliminate or reduce the potential slip in/at the elastomer-pulley body interface and/or the elastomer-inertia ring interface that occurs during belt start-stop scenarios in existing torsional vibration dampers, especially those that have concentric constructions rather than the disclosed axial construction and/or are "indirect drive systems," and improve the axial and radial run-outs between the seal nose 10 (FIG. 1) and the belt-engaging surface 112. Moreover, the constructions provide the option for at least six different elastomeric member constructions that are less complex, less costly, and easier to assemble and disassemble than the indirect drive systems of the prior art.

Figure 6:
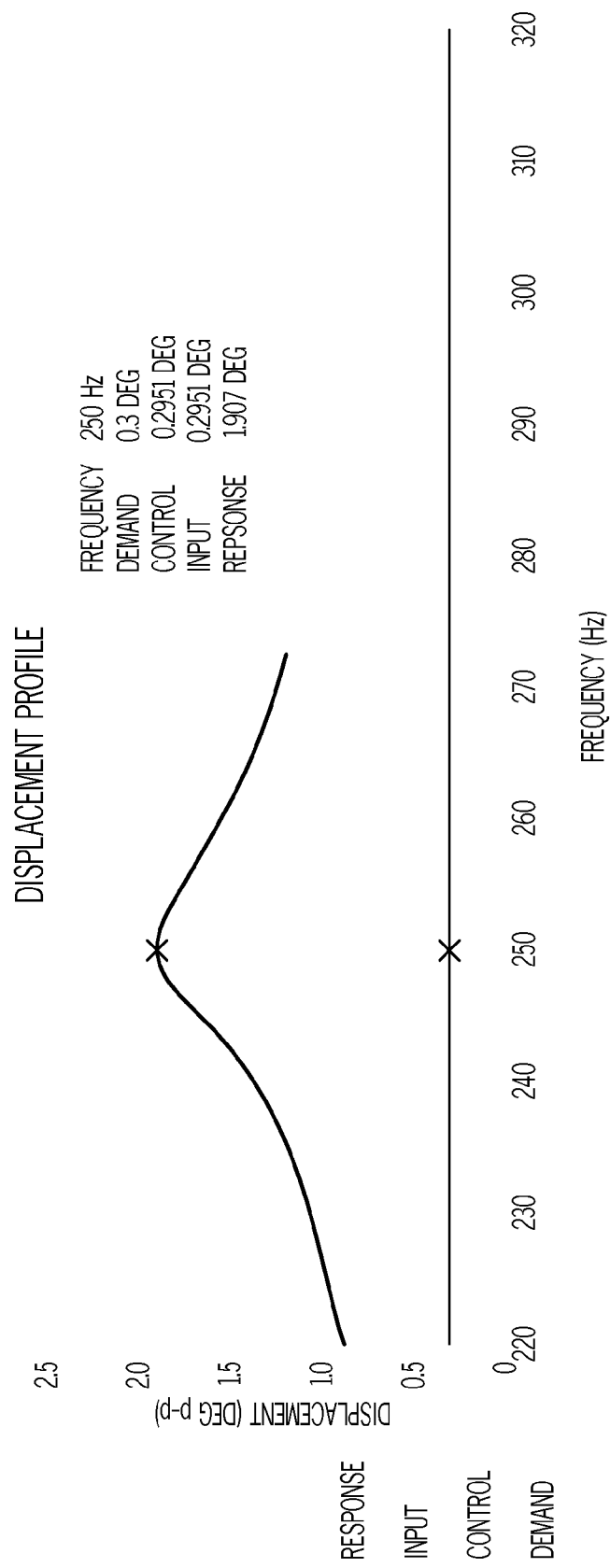
FIG. 6 is a graph of a displacement profile of a typical prior art "indirect" damper.

Additionally, the torsional vibration dampers disclosed herein transmit less angular vibrations into the FEAD system by about a factor of 6 up to about a factor of 10. This reduction can be explained by comparing the behavior of a typical damper and an embodiment of the dampers disclosed herein as shown in the graphs of FIG. 6. FIG. 6 is a plot of displacement versus frequency. As seen at a frequency of 250 Hz, the demand is 0.3 degrees and the response is 1.9 degrees. In a direct drive system, the angular vibration into the FEAD will be equal to the demand, i.e., 0.3 degrees in this example. In an indirect drive system, the angular vibrations into the FEAD will be equal to the response, i.e., 1.9 degrees. The comparison of these two values provides a magnification factor of 1.9/0.3, which is about a factor of 6. Depending upon the specifics of the system and the damper such as the elastomeric material selected, the mass of the inertia ring, angular vibrations of the crankshaft, and the reduction of angular vibrations transmitted into the FEAD may be as high as a factor of 10.

Referring now to FIGS. 2 and 3, the torsional vibration damper 100 includes from left to right, relative to the orientation of the drawing relative to the page, fasteners 114, a first inertia member 108, a first elastomeric member 104, a pulley body-hub monolithic member 101, a second elastomeric member 106, and a second inertia member 110. These components are operatively coupled together by the fasteners 114 for rotation together. There is no relative rotation of any components and no translation of any components relative to another component.

Still referring to FIGS. 2 and 3, the pulley body-hub monolithic member 101 includes a hub portion 102 and a pulley body portion 103. The hub portion 102 defines the axis of rotation A for the torsional vibration damper 100 and has a bore 116 therethrough configured to receive and be coupled to a shaft for rotational movement therewith. In one embodiment, the bore 116 receives a crankshaft of an engine. The pulley body portion 103 includes a plate 118 extending radially outward about the hub portion 102 and an annular ring 111 having an outer belt engaging surface 112 forming the outer-most side of the plate 118. The plate 118 may include a plurality of apertures 148 extending axially therethrough thereby defining a plurality of spokes 150 extending from the hub portion 102. The apertures 148 reduce the overall weight of the pulley body-hub monolithic member 101 and provide a hole for the fasteners to connect the first inertia member 108 to the second inertia member 110. The belt engaging surface 112 of the pulley body portion 102 may be flat, contoured to receive a rounded belt, or have V-grooves for mating with the V-ribs of a V-ribbed belt or any other required contoured groove to mate with an endless belt.

As seen in FIG. 2, the hub portion 102 may extend axially in only one direction from the plate 118 thereby defining the back face of the torsional vibration damper 100, which is mounted onto the crankshaft facing the engine. Opposite thereof, congruent face 134 of the plate 118 defines the front face of the torsional vibration damper 100, which will receive the nose seal 10 (FIG. 1) fastening the torsional vibration damper 100 to a shaft for rotation therewith.

The pulley body-hub monolithic member 101 may be cast, spun, forged, machined, or molded using known or hereinafter developed techniques. Suitable material for the pulley body-hub monolithic member 101 includes iron, steel, aluminum, other suitable metals, plastics, or a combination thereof, including composite materials.

Figure 4A:
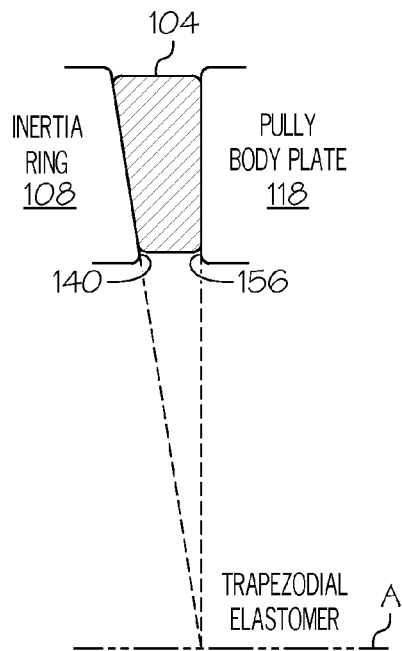
FIGS. 4A-4C are cross-sections taken parallel to the axis of rotation of the torsional vibration damper showing a portion of the pulley body, the first elastomeric member, and a portion of the one inertia member to illustrate different embodiments for the opposing faces that hold the first elastomeric member in place.
Figure 4B:
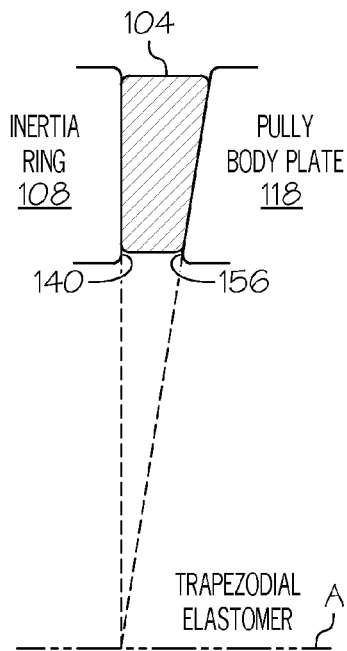
Figure 4C:
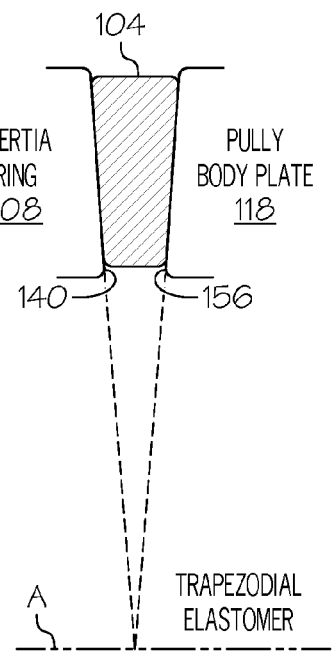

Now turning to the first and second elastomeric member 104 and 106 and the first and second inertia members 108, 110 of FIGS. 2 and 3, these members are shown as annular bodies having first and second major opposing surfaces 140, 142, an inner side 144 and an outer side 146 as labeled in FIG. 3 with respect to the first and second inertia member 108, 110, but are not limited thereto. The first and second inertia members 108, 110 may be made from any material having a sufficient mass, usually a cast iron metal. As seen in FIGS. 4A and 4C, the first major surface 140 of the first inertia ring 108 may be beveled for at least the portion seated against the first elastomeric member 104 or as seen in FIG. 4B may be straight, i.e., generally perpendicular to the axis of rotation A. Likewise, the second major surface 142 of the second inertia ring 110 may also be beveled or straight for mating against the second elastomeric member 106. In the embodiments of FIGS. 4A-4C, the portion of the congruent faces 136, 138 of plate 118 that mates against the respective elastomeric members 104, 106 may also be beveled or straight. The surface that is beveled is beveled radially outwardly, thereby defining a smaller gap for the elastomeric member more proximate the axis of rotation than most distal from the axis of rotation. Accordingly, multi-variations are possible for defining the gaps 156 in which the first and second elastomers 104, 106 are held, respectively, but the result is an elastomeric member having a generally trapezoidal longitudinal cross-section relative to the axis of rotation.

Figure 5A:
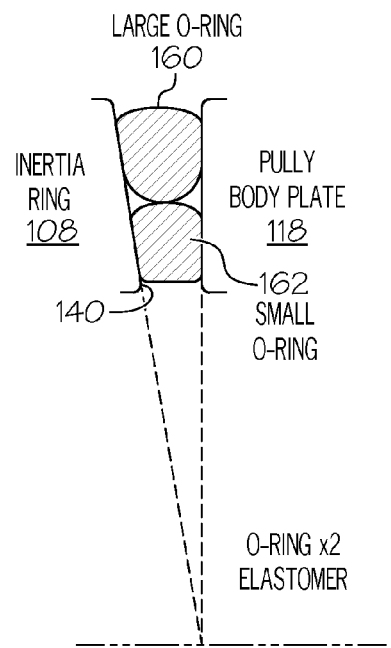
FIGS. 5A-5C are cross-sections taken parallel to the axis of rotation of the torsional vibration damper showing a portion of the pulley body, the first elastomeric member as concentric O-rings, and a portion of the one inertia member to illustrate different embodiments for the opposing faces that hold the first elastomeric member in place.
Figure 5B:
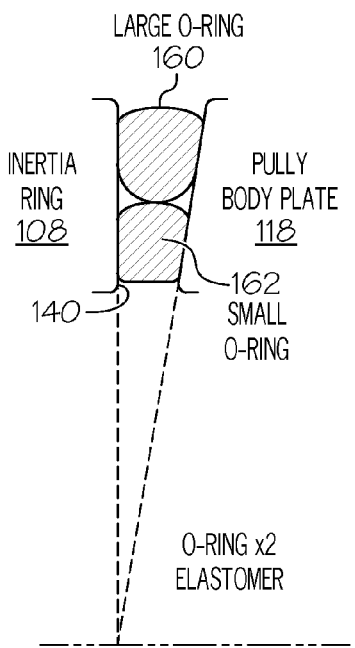
Figure 5C:
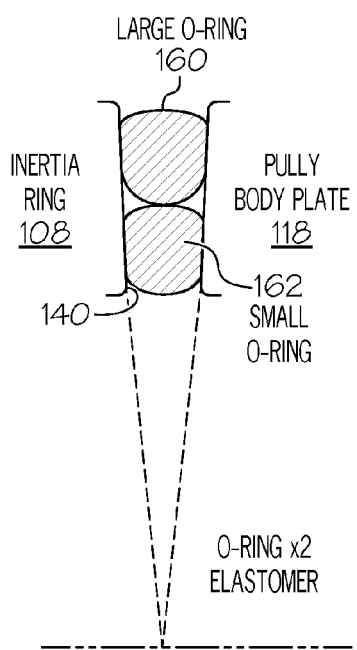

In the embodiments disclosed in FIGS. 5A-5C, the congruent faces 136, 138 of the plate 118 and the portion of the first major surface 140 of the first inertia member 108 (and second major surface 142 of the second inertia member 110 (not shown)) may either one or both be beveled as described above, and the elastomeric members 104, 106 may be a plurality of O-rings, X-rings, V-rings, square rings, or other rings of elastomeric material. For these embodiments, each elastomeric member 104, 106 may include a first O-ring 160 and a second O-ring 162, where the first O-ring 160 has a larger inner diameter than the outer diameter of the second O-ring 162 and the first O-ring 160 is disposed concentric with and radially outward of the second O-ring 162. The use of O-ring type elastomeric members may provide a more cost-effective product and assembly thereof.

The first and second elastomeric members 104, 106 may be any suitable elastomer to absorb and/or dampen the torsional vibrations generated by a rotating shaft upon which the torsional vibration damper 100 is mounted. The elastomeric members may have a generally low tensile modulus and high yield strain. The elastomeric members may be made from the same or different elastomers. The elastomer is preferably one suitable for automotive engine applications, i.e., suitable to withstand temperatures experienced in the engine and road temperatures and conditions. In one embodiment, the elastomer members may be made from or include one or more of a styrene-butadiene rubber, a natural rubber, a nitrile butadiene rubber, an ethylene propylene diene rubber (EPDM), an ethylene acrylic elastomer, a hydrogenated nitrile butadiene rubber, and a polycholoroprene rubber. One example of an ethylene acrylic elastomer is VAMAC® ethylene acrylic elastomer from E. I. du Pont de Nemours and Company. The elastomeric member may be a composite material that optionally includes a plurality of fibers dispersed therein. The fibers may be continuous or fragmented (chopped) aramid fiber like the fiber sold under the name TECHNORA® fiber.

The fasteners 114 may be bolts, screws, rivets, or the like. In one embodiment, the fasteners are bolts, such as a shoulder bolt. As seen in FIGS. 2 and 3, the shoulder 170 of the bolt 114 hits a hard stop against one of the inertia members, second inertia member 110 in FIG. 2, which may also include a threaded bore 172 for receiving a threaded end 174 of the bolt. Accordingly, each fastener 114 may include a head portion 176, a shaft 178, which includes the shoulder 170, and a threaded end 174. As seen in the assembled torsional vibration damper 100 of FIG. 3, the fasteners 114 extend through bores 180 (nonthreaded) in the first inertia member, through a respective aperture 148 in the plate 118 of the pulley body portion 103 and are threaded into a threaded bore 172 of the second inertia member 110. The fasteners 114 may be such that the head portion 176 is countersunk into the first inertia member 108.

Figure 7:
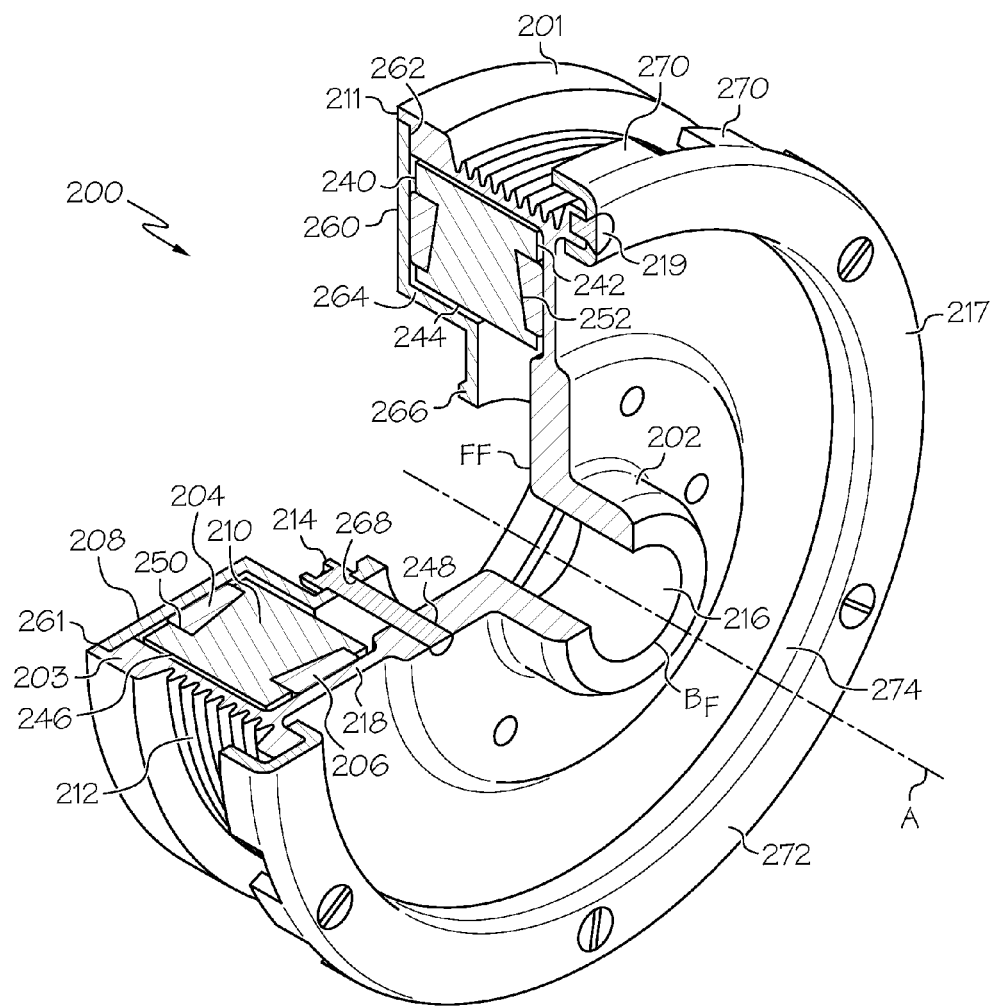
FIG. 7 is a partial cut-away, perspective view of a second embodiment of a torsional vibration damper mountable on a crankshaft in an engine.

Referring now to FIG. 7, another embodiment of a torsional vibration damper, generally designated as reference number 200, includes from left to right, relative to the orientation of the drawing on the page, a front end cap 208, a first elastomeric member 204, an inertia member 210, a second elastomeric member 206, and a pulley body-hub monolithic member 201. These components are operatively coupled together by the hub fasteners 114 for rotation together. The torsional vibration damper 200 may also include, still moving from left to right, an optional tone wheel 217 attached to the pulley-body monolithic member 201 by tone wheel fasteners 219 for rotation therewith. There is no relative rotation of any components and no translation of any components relative to another component.

The pulley body-hub monolithic member 201 includes a hub portion 202 and a pulley body portion 203. The hub portion 202 defines the axis of rotation A for the torsional vibration damper 200 and has a bore 216 therethrough configured to receive and be coupled to a shaft for rotational movement therewith. In one embodiment, the bore 216 receives a crankshaft of an engine. The pulley body portion 203 includes a plate 218 extending radially outward about the hub portion 202 and an annular ring 211 having an outer belt engaging surface 212 forming the outer-most side of the plate 218. The plate 218 may include a plurality of apertures 248 passing therethrough to receive the hub fasteners 214 to connect the front end cap 208 thereto to retain therebetween the first and second elastomeric member 204, 206 and the inertia member 210. The belt engaging surface 212 of the pulley body portion 202 may be flat, contoured to receive a rounded belt, or have V-grooves for mating with the V-ribs of a V-ribbed belt or any other required contoured groove to mate with an endless belt.

As seen in FIG. 7, the hub portion 202 may extend axially in only one direction from the plate 218 thereby defining the back face BF of the torsional vibration damper 200, which is mounted onto the crankshaft facing the engine. Opposite thereof, the plate 218 defines the front face FF of the torsional vibration damper 200, which will receive the nose seal 10 (FIG. 1) fastening the torsional vibration damper 200 to a shaft for rotation therewith.

The pulley body-hub monolithic member 201 and the front end cover 208 may both be cast, spun, forged, machined, or molded using known or hereinafter developed techniques. Suitable material for the pulley body-hub monolithic member 201 includes iron, steel, aluminum, other suitable metals, plastics, or a combination thereof, including composite materials.

Still referring to FIG. 7, the inertia member 210 is an annular body having opposing front and back surfaces 240, 242, an inner surface 244 and an outer surface 246 and may be made from any material having a sufficient mass, usually a cast iron metal. The front surface 240 may be beveled for at least the portion against which is seated the first elastomeric member 204 or as seen in FIG. 4B may be straight, i.e., generally perpendicular to the axis of rotation A. Likewise, the back surface 242 of the second inertia ring 210 may also be beveled or straight for mating against the second elastomeric member 206. Moreover, the inertia member 210 may include a first annular groove 250 in the front surface 240 as a receptacle for at least a portion of the first elastomeric member 204 and a second annular groove 252 in the back surface 242 as a receptacle for at least a portion of the second elastomeric member 206.

Either or both of the first and second elastomeric members 204, 206 may have a trapezoidal geometry in cross-section once assembled as shown in FIG. 7. Here, the first elastomeric member 204 is compressed between the pulley body plate 118 and the front end cap 208 and the inertia member 210 wherein one or both thereof may have an angled face mated against the first elastomeric member. Similarly, the second elastomeric member 206 is compressed against one or more angled faces, but those faces are of the inertia member 210 and the pulley body plate 218. Such configurations are illustrated generally in FIGS. 4A-4C. In another embodiment, the first and second elastomeric members 204, 206 may be comprised of two concentric rings as explained above with respect to FIGS. 5A-5C. As seen in FIGS. 4A-4C and FIGS. 5A-5C, the angled surface may be beveled radially outwardly, thereby defining a smaller gap for the elastomeric members more proximate the axis of rotation than most distal from the axis of rotation. The first and second elastomeric members 204 and 206 may be made of the same materials described above with respect to FIGS. 2-3.

Referring once again to FIG. 7, the front end cap 208 is fixedly or removably attachable to the pulley body-hub monolithic member 201 by the hub fasteners 214 or other methods. The hub fasteners 214 may be bolts, screws, rivets, or the like. In one embodiment, the fasteners are bolts, such as a shoulder bolt shown in FIG. 7 and as described above with respect to FIGS. 2 and 3. In another embodiment, the hub fasteners 214 may be omitted and instead the front end cover 208 may be connected to the pulley body-hub monolithic member 201 by roll or orbit forming, a press-fit connection, or welded thereto. The front end cap 208 has a primary generally planar ring 260 having its outer side 261 and a portion of the back surface 262, most proximate the outer side 261, seated against the annular ring 211 that defines the belt-engaging surface 212 and having a hollow neck 264 extending away from the planar ring 260 toward the front face FF of the pulley body-hub monolithic member 201. The neck 264 includes an annular flange 266 projecting radially inward toward the axis of rotation A. Within annular flange 266, a plurality of holes 268 are present to receive the hub fasters 214. As seen in FIG. 7, the front end cap 208, in this embodiment, is instrumental in compressing the first and second elastomeric members 204, 206 and in maintaining the assembly of the components of the torsional vibration damper 200.

Still referring to FIG. 7, the torsion vibration damper 200 optionally includes the tone wheel 217 fixedly or removably attached to the back face side of the annular ring 211 by tone wheel fasteners 219. The fasteners 219 may be as described above for hub fasteners 214. In another embodiment, the tone wheel 217 may be attachable to the annular ring 211 by any of the other connection alternatives discussed above. The tone wheel 217 has a plurality of spaced-apart teeth 270 axially extending from an annular base 272 having a plurality of holes for receiving the tone wheel fasteners 219 or in another embodiment having a connector such as being roll or orbit forming to the annular ring 211, a press-fit connection thereto, or being welded thereto. The teeth 270 as shown in FIG. 7 form an annular discontinuous flange connected to the outer periphery of the base 272. The inner periphery of base 272 may include a lip or continuous flange 274 to more stably connect the tone wheel 217 to the pulley body-hub monolithic member 201.

The embodiment of FIG. 7 provides the same advantages as the embodiment of FIGS. 2 and 3, but additionally, by having the inertia member 210 just at the front face FF side of the pulley body-hub monolithic member 201, provides room to mount or connect a tone wheel to the annular ring 211 of the pulley body portion 203.

Another advantage to the torsional vibration dampers 100, 200 disclosed herein is the ability to disassemble by removal of the hub fasteners 114, 214 while the pulley body-hub monolithic members 101, 201 are still attached to a crankshaft to remove and replace the elastomeric members 104, 106, 204, 206 after wear. Accordingly, in one aspect, methods are disclosed that include providing a torsional vibration damper 100 or 200 attached to a shaft for rotation therewith, wherein after wear of the first and second elastomeric members 104, 106, 204, 206, the method includes removing the one or more hub fasteners 114, 214, removing the one or more inertia members 106, 110, 210 (and the front end cover 208 for torsional vibration damper 200), and the first and second elastomeric members 104, 106, 204, 206 and subsequently replacing the first and second elastomeric members with new elastomeric members and re-assembling the torsional vibration damper, including fastening the components back together with the one or more hub hasteners 114, 214.

Although the invention is shown and described with respect to certain embodiments, it is obvious that modifications will occur to those skilled in the art upon reading and understanding the specification, and the present invention includes all such modifications.

What is claimed is:

1. A torsional vibration damper comprising:
a hub integral with a pulley body for rotation therewith, the pulley body having an outer belt-engaging surface;
an annular first elastomeric member seated on the pulley body between the outer belt engaging surface and the hub and held thereagainst for rotation therewith by a first inertia ring connected to the pulley body; and
an annular second elastomeric member seated against the pulley body or a cap connected to the pulley body by the first inertia member or by a second inertia ring;
wherein one or more of the portion of the first inertia ring and portion of the pulley body in contact with the annular first elastomeric member is beveled radially outward, thereby defining a smaller gap for the annular first elastomeric member more proximate the axis of rotation than most distal the axis of rotation, and one or more of the portion of the second inertia ring and portion of the pulley body or the cap in contact with the annular second elastomeric member is beveled radially outward, thereby defining a smaller gap for the annular second elastomeric member more proximate the axis of rotation than most distal the axis of rotation.

2. The torsional vibration damper of claim 1, wherein the annular second elastomeric member is seated against the pulley body, on a side opposite the annular first elastomeric member, between the outer belt engaging surface and the hub and held thereagainst for rotation therewith by the second inertia ring.

3. The torsional vibration damper of claim 2, further comprising one or more fasteners connecting the first inertia member to the second inertia member.

4. The torsional vibration damper of claim 1, wherein the annular first and second elastomeric members, in an assembled cross-section taken along the axis of rotation, have a trapezoidal cross-section.

5. The torsional vibration damper of claim 1, wherein the annular first elastomeric member comprises a first O-ring and a second O-ring, wherein the first O-ring has a larger inner diameter than the outer diameter of the second O-ring, and the first O-ring is disposed concentric with and radially outward of the second O-ring.

6. The torsional vibration damper of claim 5, wherein the first O-ring is seated against the second O-ring.

7. The torsional vibration damper of claim 1, wherein the annular second elastomeric member is seated against the first inertia member, on a side opposite the annular first elastomeric member, between the first inertia member and the cap and compressed thereagainst for rotation therewith by the cap.

8. The torsional vibration damper of claim 1, further comprising a tone wheel connected to the pulley body.

9. A front end accessory drive system comprising:
a torsional vibration damper comprising:
a hub integral with a pulley body for rotation therewith, the pulley body having an outer belt-engaging surface;
an annular first elastomeric member seated on the pulley body between the outer belt engaging surface and the hub and held thereagainst for rotation therewith by a first inertia ring connected to the pulley body having a hub capable of receiving a crankshaft, the hub disposed concentric with and spaced radially outward from the crankshaft; and
an annular second elastomeric member seated against the pulley body or a cap connected to the pulley body by the first inertia member or by a second inertia ring;
wherein one or more of the portion of the first inertia ring and portion of the pulley body in contact with the annular first elastomeric member is beveled radially outward, thereby defining a smaller gap for the annular first elastomeric member more proximate the axis of rotation than most distal the axis of rotation, and one or more of the portion of the second inertia ring and portion of the pulley body or the cap in contact with the annular second elastomeric member is beveled radially outward, thereby defining a smaller gap for the annular second elastomeric member more proximate the axis of rotation than most distal the axis of rotation;
an endless drive belt operably associated with the outer belt-engaging surface of the pulley body; and
one or more accessories for a vehicle engine, each of the one or more accessories having a shaft and a corresponding pulley operably associated with the endless drive belt.

10. The front end accessory drive system of claim 9, wherein the annular second elastomeric member is seated against the pulley body, on a side opposite the annular first elastomeric member, between the outer belt engaging surface and the hub and held thereagainst for rotation therewith by the second inertia ring connected to the pulley body.

11. The front end accessory drive system of claim 10, further comprising one or more fasteners connecting the first inertia member to the second inertia member.

12. The front end accessory drive system of claim 10, wherein the annular second elastomeric member, in an assembled cross-section taken along the axis of rotation, has a trapezoidal cross-section.

13. The front end accessory drive system of claim 9, wherein the annular first elastomeric member comprises a first O-ring and a second O-ring, wherein the first O-ring has a larger inner diameter than the outer diameter of the second O-ring, and the first O-ring is disposed concentric with and radially outward of the second O-ring.

14. The front end accessory drive system of claim 9, wherein the annular second elastomeric member is seated against the first inertia member, on a side opposite the first elastomeric member, between the first inertia member and the cap and compressed thereagainst for rotation therewith by the cap.

15. The front end accessory drive system of claim 9, further comprising a tone wheel connected to the pulley body.

\* \* \* \* \*